United States Patent
Ghatage et al.

(10) Patent No.: US 10,706,030 B2
(45) Date of Patent: Jul. 7, 2020

(54) UTILIZING ARTIFICIAL INTELLIGENCE TO INTEGRATE DATA FROM MULTIPLE DIVERSE SOURCES INTO A DATA STRUCTURE

(71) Applicant: Accenture Global Solutions Limited, Dublin (IE)

(72) Inventors: Prakash Ghatage, Bangalore (IN); Nirav Sampat, Mumbai (IN); Kumar Viswanathan, Bangalore (IN); Naveen Kumar Thangaraj, Salem (IN); Bhushan Ananda Patil, Bangalore (IN); Prabhat Kumar Singh, Chapra (IN)

(73) Assignee: Accenture Global Solutions Limited, Dublin (IE)

( * ) Notice: Subject to any disclaimer, the term of this patent is extended or adjusted under 35 U.S.C. 154(b) by 269 days.

(21) Appl. No.: 15/885,330

(22) Filed: Jan. 31, 2018

(65) Prior Publication Data

US 2019/0236173 A1   Aug. 1, 2019

(51) Int. Cl.
*G06F 16/22* (2019.01)
*G06N 20/00* (2019.01)
*G06F 16/25* (2019.01)

(52) U.S. Cl.
CPC ............ *G06F 16/22* (2019.01); *G06F 16/252* (2019.01); *G06N 20/00* (2019.01)

(58) Field of Classification Search
None
See application file for complete search history.

(56) References Cited

U.S. PATENT DOCUMENTS 8,473,519 B1   6/2013   Siddiqui et al.
2010/0145902 A1*   6/2010   Boyan ................... G06F 16/958
706/54

OTHER PUBLICATIONS

Dell, "Boomi Technology", http://www.dell.com/en-us/work/learn/boomi, Aug. 2014, 4 pages.

\* cited by examiner

*Primary Examiner* — Giuseppi Giuliani
(74) *Attorney, Agent, or Firm* — Harrity & Harrity, LLP

(57) ABSTRACT

A device extracts data files from different data sources, and processes the data files to generate data from the data files. The device trains a first artificial intelligence model and a second artificial intelligence model based on historical data parameters, wherein the historical data parameters are associated with historical data previously processed by the device. The device utilizes the trained first artificial intelligence model and the data to generate data parameters for the data, and utilizes the trained second artificial intelligence model, the data, and the data parameters to generate a data structure configuration. The device generates a data structure for the data based on the data parameters and the data structure configuration, stores the data in the data structure, and provides a user interface for accessing the data structure.

20 Claims, 10 Drawing Sheets

UTILIZING ARTIFICIAL INTELLIGENCE TO INTEGRATE DATA FROM MULTIPLE DIVERSE SOURCES INTO A DATA STRUCTURE

BACKGROUND

Data integration includes combining data residing in different data sources, and providing users with a unified view of the data. Data integration has become significant in a variety of situations, such as commercial situations (e.g., when two companies need to merge databases), scientific situations (e.g., combining research results from different repositories), and/or the like.

SUMMARY

According to some implementations, a device may include one or more memories, and one or more processors, communicatively coupled to the one or more memories, to extract data files from different data sources, and process the data files to generate data from the data files. The one or more processors may train a first artificial intelligence model and a second artificial intelligence model based on historical data parameters, wherein the historical data parameters may be associated with historical data previously processed by the device. The one or more processors may utilize the trained first artificial intelligence model and the data to generate data parameters for the data, and may utilize the trained second artificial intelligence model, the data, and the data parameters to generate a data structure configuration. The one or more processors may generate a data structure for the data based on the data parameters and the data structure configuration, may store the data in the data structure, and may provide a user interface for accessing the data structure.

According to some implementations, a non-transitory computer-readable medium may store instructions that include one or more instructions that, when executed by one or more processors, cause the one or more processors to receive, from a client device, a request to create a data structure from a plurality of different data sources, and extract data files from the plurality of different data sources based on the request. The one or more instructions may cause the one or more processors to process the data files to generate processed data files, extract data from the processed data files, and process the data to generate processed data. The one or more instructions may cause the one or more processors to train a first artificial intelligence model and a second artificial intelligence model based on historical data parameters, wherein the historical data parameters may be associated with previously processed historical data. The one or more instructions may cause the one or more processors to utilize the trained first artificial intelligence model and the processed data to generate data parameters for the processed data, and utilize the trained second artificial intelligence model, the processed data, and the data parameters to generate a data structure configuration. The one or more instructions may cause the one or more processors to generate a data structure for the processed data based on the data parameters and the data structure configuration, store the processed data in the data structure, and provide a user interface for accessing the data structure.

According to some implementations, a method may include extracting, by a device, data files from different data sources, and extracting, by the device, data from the data files. The method may include training, by the device, a first artificial intelligence model and a second artificial intelligence model based on historical data parameters, wherein the historical data parameters may be associated with historical data previously processed by the device. The method may include utilizing, by the device, the trained first artificial intelligence model and the data to generate data parameters for the data, and utilizing, by the device, the trained second artificial intelligence model, the data, and the data parameters to generate a data structure configuration. The method may include generating, by the device, a data structure for the data based on the data parameters and the data structure configuration, and storing, by the device, the data in the data structure. The method may include utilizing, by the device, a trained third artificial intelligence method to test the data structure, and identifying, by the device, one or more corrections to the data structure based on testing the data structure. The method may include implementing, by the device, the one or more corrections in the data structure to generate an updated data structure, and providing, by the device, a user interface for accessing the update data structure.

DETAILED DESCRIPTION

The following detailed description of example implementations refers to the accompanying drawings. The same reference numbers in different drawings may identify the same or similar elements.

Data integration appears with increasing frequency as a volume of data, such as big data, and a need to share existing data explodes. The process of integrating data from different data sources requires understanding the data in the different data sources, determining how to integrate the data into a unified view of the data, and generating the unified view of the data. However, such a process requires manual generation of code to manipulate the data and generate the unified view of the data, which is becomes more and more cumbersome, time consuming, and resource intensive as the volume of data increases.

Some implementations described herein provide an integration platform that utilizes artificial intelligence to automatically integrate data from multiple diverse sources into a unified view of the data (e.g., a data structure). For example, the integration platform may extract data files from multiple diverse data sources, and may process the data files to generate data. The integration platform may train a first artificial intelligence model and a second artificial intelligence model based on historical data parameters (e.g., associated with historical data), and may utilize the trained first artificial intelligence model and the data to generate data parameters. The integration platform may utilize the trained second artificial intelligence model, the data, and the data parameters to generate a data structure configuration, and may generate the data structure based on the data parameters and the data structure configuration. The integration platform may store the data in the data structure, and may provide a user interface for accessing the data structure.

Figure 1A:
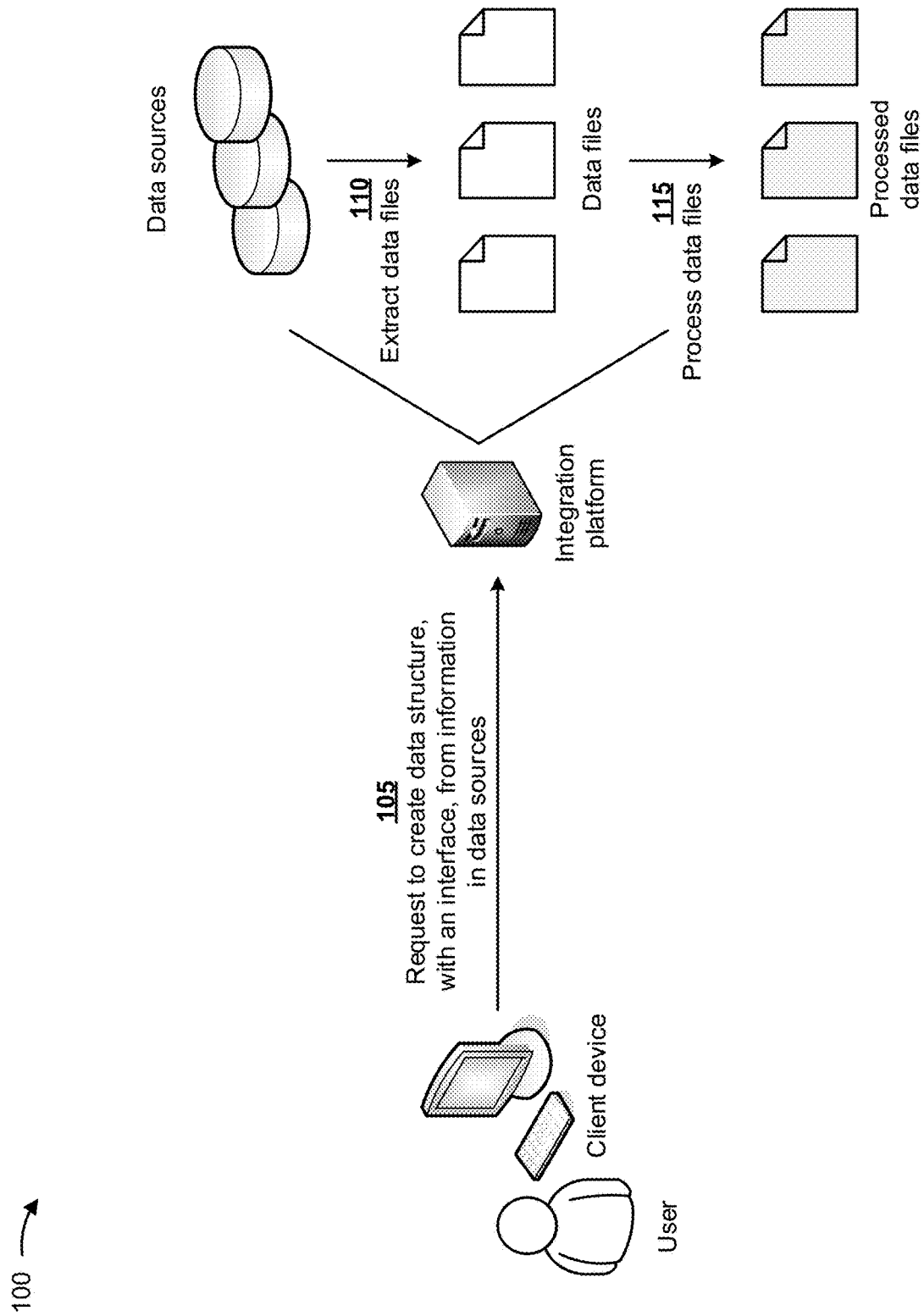
FIGS. 1A-1G are diagrams of an overview of an example implementation described herein.

FIGS. 1A-1G are diagrams of an overview of an example implementation 100 described herein. As shown in FIG. 1A, a client device may be associated with an integration platform. Assume that a user associated with the client device wishes to integrate data from multiple different data sources into a unified view (e.g., one or more data structures with a user interface for accessing the one or more data structures). As shown in FIG. 1A, and by reference number 105, the client device may provide, to the integration platform, a request to create a data structure, with an interface, from the multiple different data sources. The integration platform may receive the request to create the data structure. In some implementations, the multiple different data sources may include multiple company databases with different data points, data types, data formats, etc. in one or more databases, multiple different groups of test results, and/or the like. In some implementations, each data source may include thousands, millions, billions, etc. of data points. In some implementations, the data structure may include one more databases, tables, linked-lists, trees, and/or the like.

As further shown in FIG. 1A, based on the request to create the data structure, the integration platform may communicate with the multiple different data sources, and may extract data files from the multiple different data sources, as indicated by reference number 110. In some implementations, one or more of the data files may include different data points, data types, data formats, and/or the like. In some implementations, the integration platform may utilize a variety of data file extraction methods to extract the data files, such as extracting the data files into flat files using a structured query language (SQL), extracting the data files into flat files using a program, exporting the data files into export files, and/or the like. Extracting data files into flat files using SQL may include executing a SQL query on a data file, and directing an output of the query to a flat file. Extracting the data files using a program may include utilizing the program to extract results of any SQL query, and directing an output to a flat file. Exporting the data files into export files may include exporting the data file (e.g., including objects) into export files that include metadata as well as data.

As further shown in FIG. 1A, and by reference number 115, the integration platform may perform one or more processing techniques on one or more of the data files in order to convert the one or more data files into an electronic, or machine-encoded, data (e.g., processed data files). In some implementations, the integration platform may utilize optical character recognition (OCR) with the one or more data files in order to convert the one or more data files into electronic data files. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, the integration platform may utilize speech recognition with the one or more data files in order to convert one or more audio-based data files into text-based data files. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences. Speech recognition technology generally incorporates knowledge and research in the linguistics, computer science, and electrical engineering fields. Applications of speech recognition include data entry (e.g., entering a credit card number), preparation of structured documents (e.g. a radiology report), speech-to-text processing (e.g., word processors or emails), and/or the like.

In some implementations, the integration platform may utilize a natural language processing technique, a computational linguistics technique, a text analysis technique, and/or the like, with the processed data files and/or the one or more data files in order to make the data files analyzable. For example, the integration platform may apply natural language processing (NLP) to interpret the processed data files and generate additional information associated with the potential meaning of information within the processed data files and/or the one or more data files. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

Figure 1B:
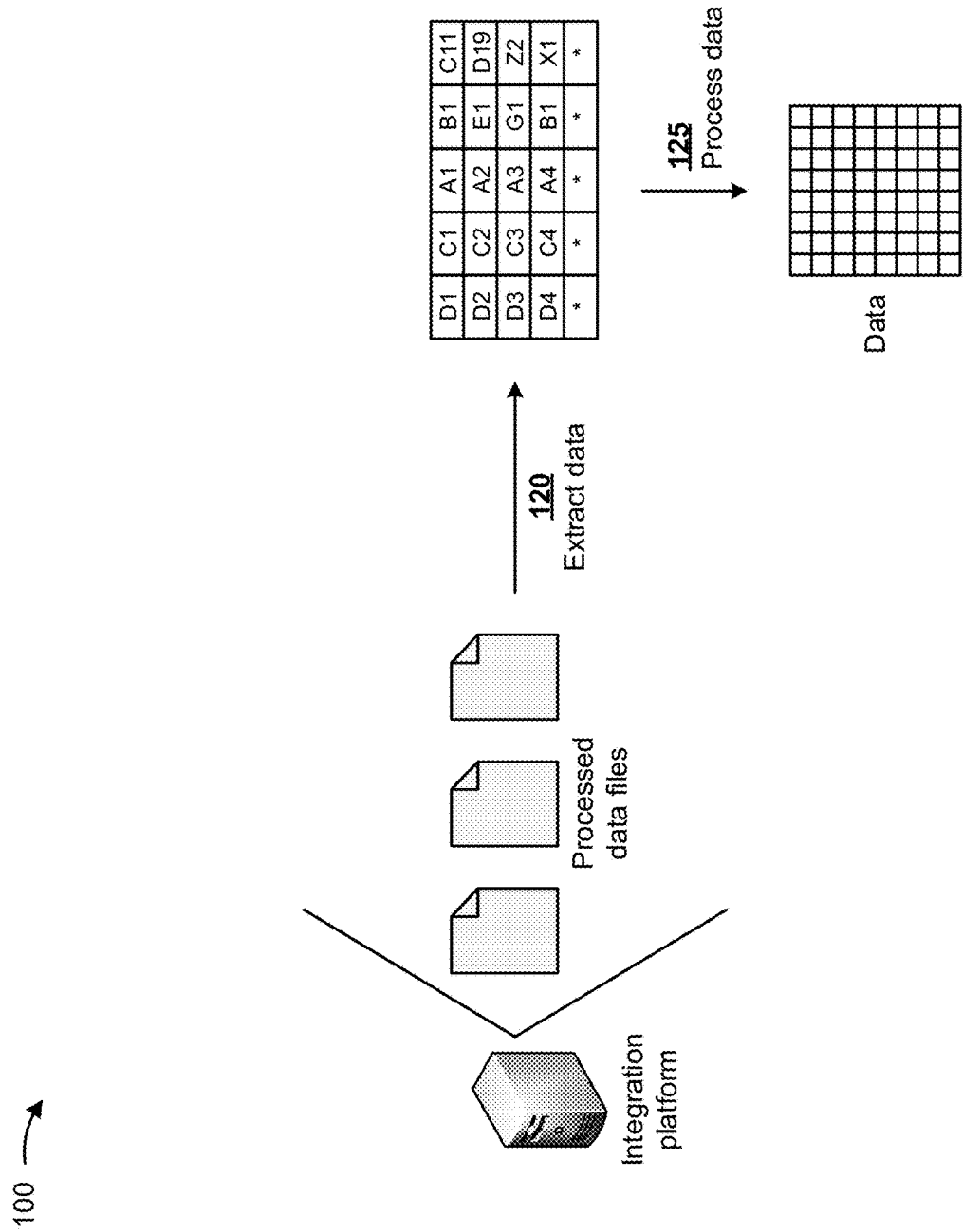

As shown in FIG. 1B, and by reference number 120, the integration platform may extract data from the processed data files. In some implementations, the integration platform may utilize a variety of data extraction methods to extract the data from the processed data files, such as logical extraction methods (e.g., a full extraction method, an incremental extraction method, and/or the like, physical extraction methods (e.g., an online extraction method, an offline extraction method, and/or the like), and/or the like. The full extraction method may include completely extracting the data from the processed data files. In the full extraction method, source data may be provided as-is and there may be no need to track the source data files for changes. In the incremental extraction method, changes in the source data files may need to be tracked since a previous successful extraction, and only the changes in data files may be extracted. The incremental extraction method may detect the changes in the data files from specific columns in the source data files that have a last changed timestamp. The online extraction method may include directly connecting to the data sources of the data files, and directly extracting the data from the source data files. The offline extraction method may include staging the data files outside the source data sources, and extracting the data from the staged data files into flat files, dump files, archive logs, tables, and/or the like.

In some implementations, the integration platform may temporarily store the extracted data and/or the processed data, described below, in one or more data structures associated with the integration platform. In such implementations, the temporarily-stored data and the one or more data structures may not be in final formats, but may be in a format that enables the integration platform to determine the final formats of the extracted data and the one or more data structures.

As further shown in FIG. 1B, and by reference number 125, the integration platform may process the extracted data. In some implementations, the integration platform may utilize a data normalization method to process the extracted data and to eliminate and/or reduce redundant data from the extracted data. The data normalization method may include identifying values or portions of data that are repeated unnecessarily in a file, data structure, and/or the like (e.g., in records or fields, within a table, and/or the like), eliminating such values or portions of data from the file, data structure, and/or the like, converting such values or portions of data from a differing and/or nonstandard format to a same and/or standard format, and/or the like. For example, the data normalization method may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, the integration platform may utilize a data cleansing method to process the extracted data and to detect and/or correct corrupt or inaccurate data from the extracted data. The data cleansing method may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any phone number related to that address). The data cleansing method may also involve activities, such as harmonization of data (e.g., harmonization of short codes (e.g., St., Rd., and/or the like) to actual words (e.g., street, road, and/or the like).

In some implementations, the integration platform may utilize a natural language processing technique, a computational linguistics technique, a text analysis technique, and/or the like, with the extracted data in order to make the extracted data analyzable. In some implementations, the integration platform may utilize an entity extraction method (e.g., also called an entity identification method, an entity chunking method, or a named-entity recognition (NER) method) to identify and classify named entities in the extracted data into pre-defined categories, such as names of persons, organizations, locations, expressions of time, quantities, monetary values, percentages, and/or the like.

In some implementations, the integration platform may utilize a smart matching method, such as a string matching method, to identify where one or more strings (e.g., patterns) are located within the extracted data. The string matching may include a naïve string search method, a Rabin-Karp string search method, a Knuth-Morris-Pratt method, a Boyer-Moore string search method, a bitap method, a two-way string-matching method, a backward non-deterministic dawg matching (BNDM) method, a backward Oracle matching (BOM) method, and/or the like.

Figure 1C:
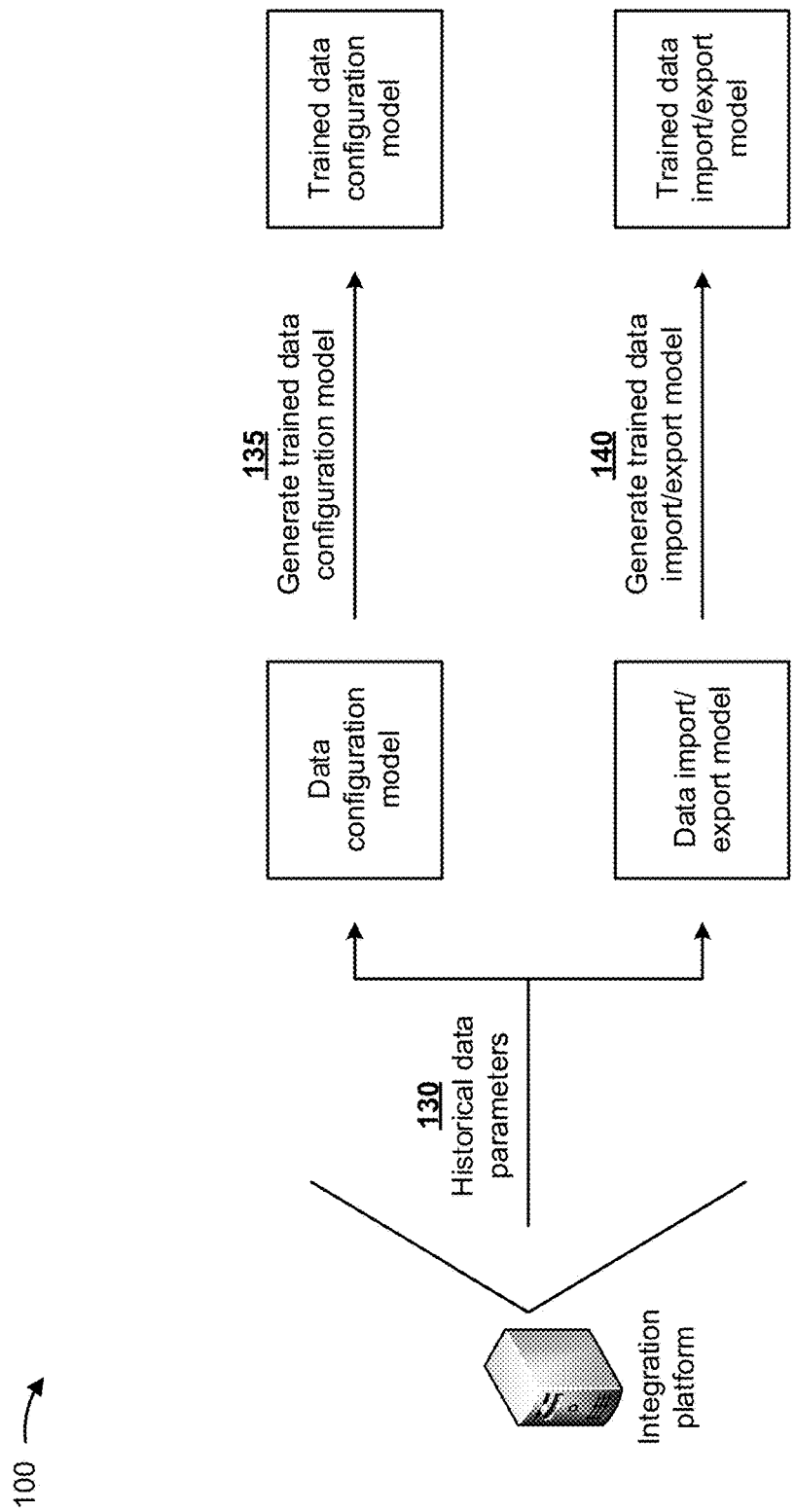

As shown in FIG. 1C, and by reference number 130, the integration platform may provide historical data parameters to a first artificial intelligence model (e.g., a data configuration model) and a second artificial intelligence model (e.g., a data import/export model). In some implementations, the functions of the integration platform described in connection with FIG. 1C, may be performed before the integration platform receives the request to create the data structure from the client device. In some implementations, the historical data parameters may include data types (e.g., numbers, alphanumeric characters, characters, words, sentences, images, audio, video, and/or the like), data formats (e.g., text, a file format, an audio format, a video format, and/or the like), configuration information associated with data structures (e.g., relational database configuration information, non-relational database configuration information, cloud database configuration information, operational database configuration information, a centralized database configuration, and/or the like), data patterns, and/or the like associated with historical data previously processed by the integrated platform or by another device.

In some implementations, the data configuration model may include a machine learning model, a naïve Bayes biased classifier model, a deep learning neural network model, a neural network model, a support vector machine model, and/or the like. In some implementations, the data configuration model may include Knuth-Morris-Pratt machine learning model that provides a recommended data structure configuration for data based on the data and data parameters of the data. The Knuth-Morris-Pratt machine learning model may search for occurrences of a word within a main text string by determining that when a mismatch occurs, the word itself embodies sufficient information to determine where a next match could begin, thus bypassing re-examination of previously matched characters.

In some implementations, the data import/export model may include a machine learning model, a naïve Bayes biased classifier model, a deep learning neural network model, a neural network model, a support vector machine model, and/or the like. In some implementations, the data import/export model may include a k-means clustering machine learning model that determines data parameters based on the data. The k-means clustering may include a method of vector quantization that may be used for cluster analysis in data mining. The k-means clustering method may partition a number (n) of observations into a number (k) of clusters in which each observation belongs to the cluster with a nearest mean, serving as a prototype of the cluster. The k-means clustering method may be associated with a k-nearest neighbor classifier method (e.g., a machine learning method for classification), and may apply a one-nearest neighbor classifier on cluster centers obtained by k-means to classify new data into existing clusters.

As further shown in FIG. 1C, and by reference number 135, the integration platform may utilize the historical data parameters to train the data configuration model, and to generate a trained data configuration model. As further shown in FIG. 1C, and by reference number 140, the integration platform may utilize the historical data parameters to train the data import/export model, and to generate a trained data import/export model.

Figure 1D:
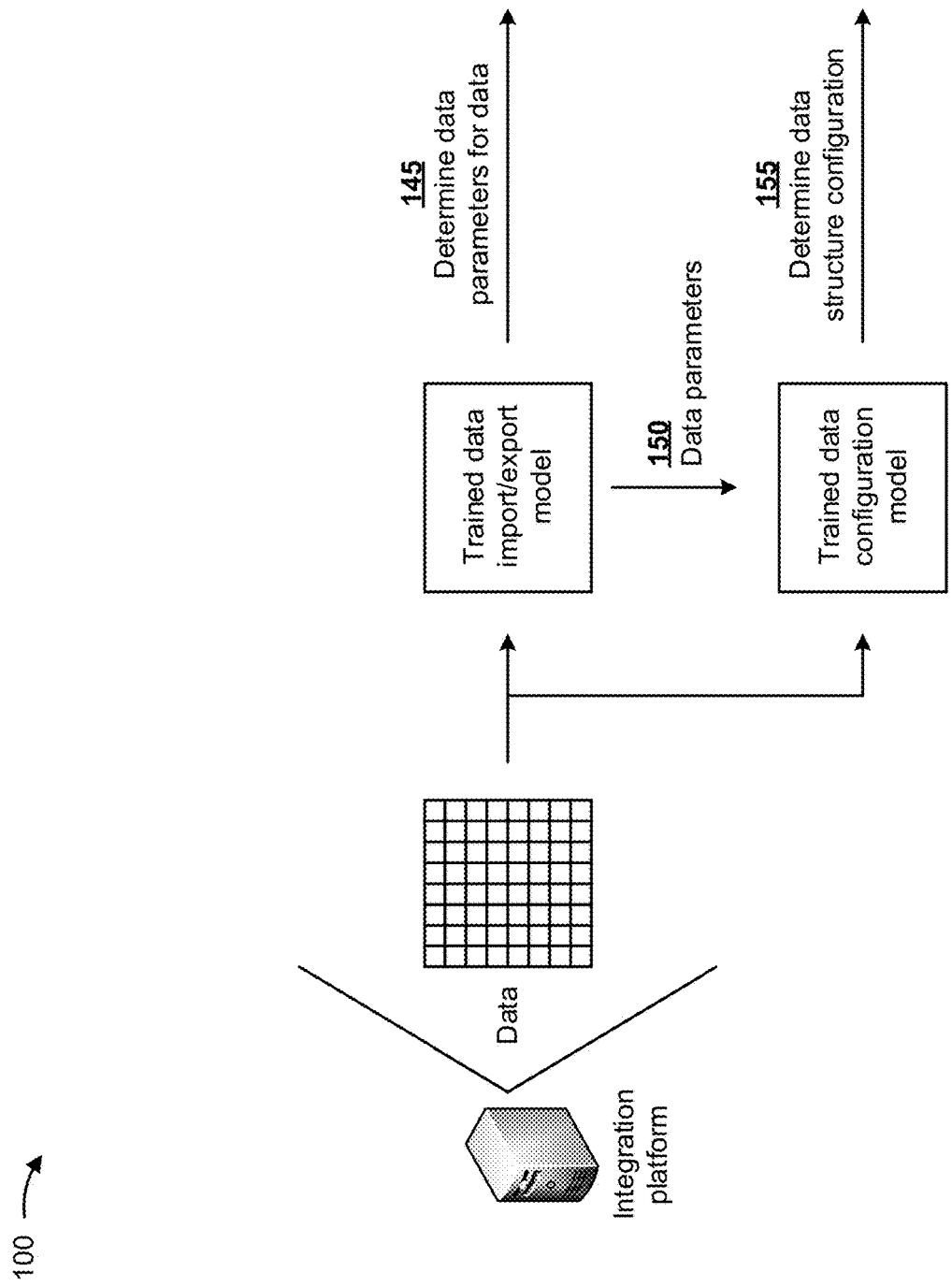

As shown in FIG. 1D, the integration platform may provide the data (e.g., the extracted and processed data) to the trained data import/export model and the trained data configuration model. As further shown in FIG. 1D, and by reference number 145, the trained data import/export model may generate data parameters for the data. In some implementations, the trained data import/export model may take a set of data points (x1, x2, . . . , xn) (e.g., from the data), where each observation is a d-dimensional real vector, and may partition the number (n) of data points from the set of data points (e.g., where n may represent a different data type) into a number (k≤n) of sets (S) (e.g., where S={S1, S2, . . . , Sk}) so as to minimize a within-cluster sum of squares (e.g., a variance). In some implementations, the trained data import/export model may cluster the extracted data with particular historical data associated with particular historical data parameters, and may identify the particular historical data parameters as the data parameters for the data. Based on this methodology, the trained data import/export model may determine the data parameters for the data.

As further shown in FIG. 1D, and by reference number 150, the trained data import/export model may provide the data parameters to the trained data configuration model. As further shown in FIG. 1D, and by reference number 155, the trained data configuration model may generate a data structure configuration for the data based on the data and the data parameters. In some implementations, the trained data configuration model may match a proposed data structure configuration (e.g., determined based on the data and the data parameters) with a previous data structure configuration (e.g., determined based on the historical data parameters) in order to generate the data structure configuration for the data. In some implementations, the trained data configuration model may match the data parameters with particular historical data parameters, may determine a historical data structure configuration associated with the particular historical data patterns, and may identify the historical data structure configuration as the data structure configuration for the data. Based on this methodology, the trained data configuration model may determine the data structure configuration for the data. In some implementations, the data structure configuration may include configuration information indicating a type of data structure configuration (e.g., a database, a tree, a linked-list, and/or the like), an arrangement of data in the data structure (e.g., a relational arrangement, a non-relational arrangement, a number of columns, a number of rows, and/or the like), and/or the like.

Figure 1E:
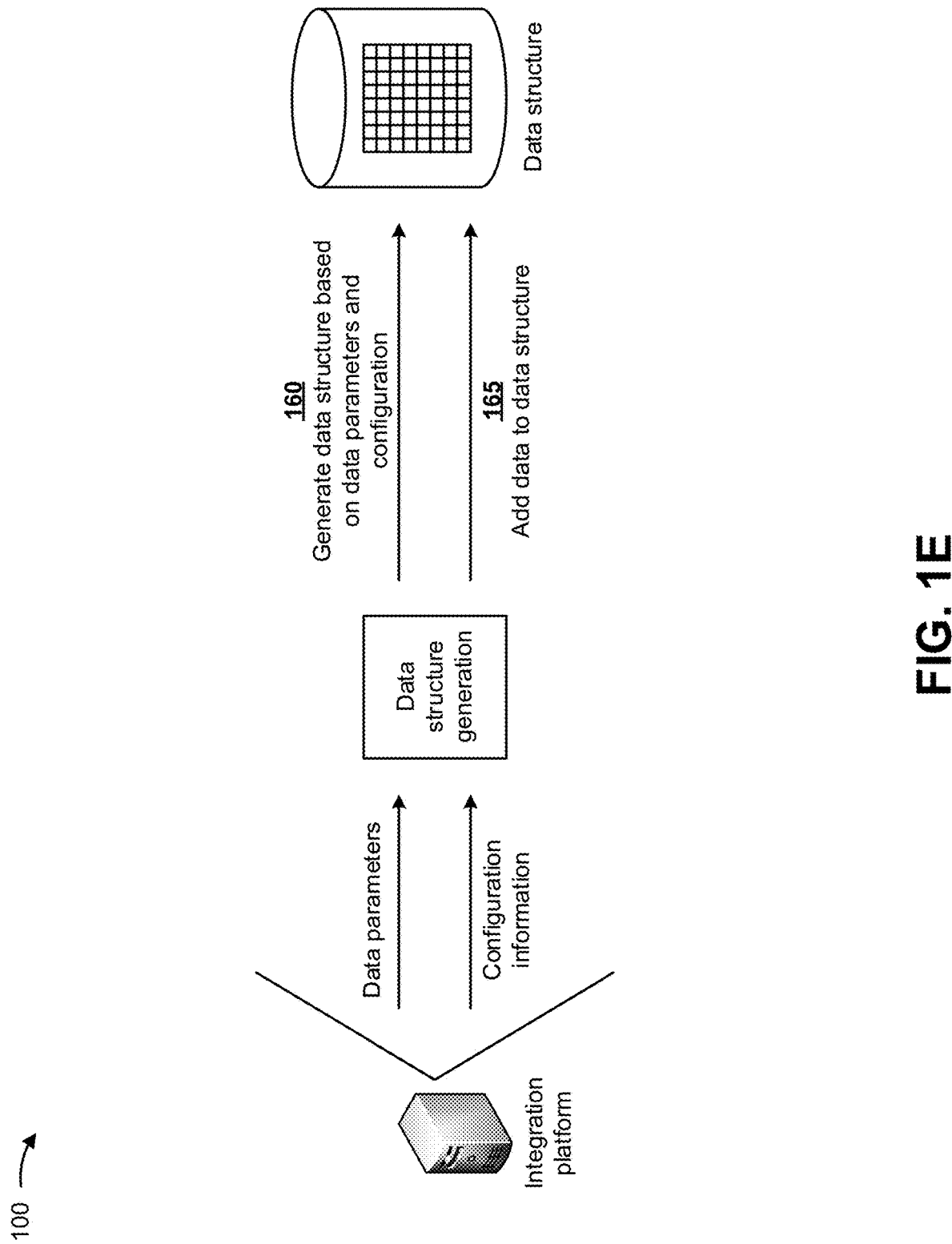

As shown in FIG. 1E, and by reference number 160, the integration platform may generate a data structure (e.g., for the extracted data) based on the data parameters and the configuration information. In some implementations, the data structure may include a configuration that matches the data structure configuration generated by the trained data configuration model. For example, the data structure may include a type of data structure configuration (e.g., a database, a tree, a linked-list, and/or the like), an arrangement of data in the data structure (e.g., a relational arrangement, a non-relational arrangement, a number of columns, a number of rows, and/or the like), and/or the like that matches the type of data structure configuration, the arrangement of data, and/or the like of the data structure configuration generated by the trained data configuration model.

As further shown in FIG. 1E, and by reference number 165, the integration platform may add the extracted data to the generated data structure. In some implementations, the integration platform may add the extracted data to the data structure in a manner such that the generated data parameters are satisfied. For example, if the data parameters indicate that data types of the data are numbers and characters, and that a data format of the data is in a spreadsheet with columns and rows, the integration platform may add the data as numbers and characters in columns and rows of the data structure.

Figure 1F:
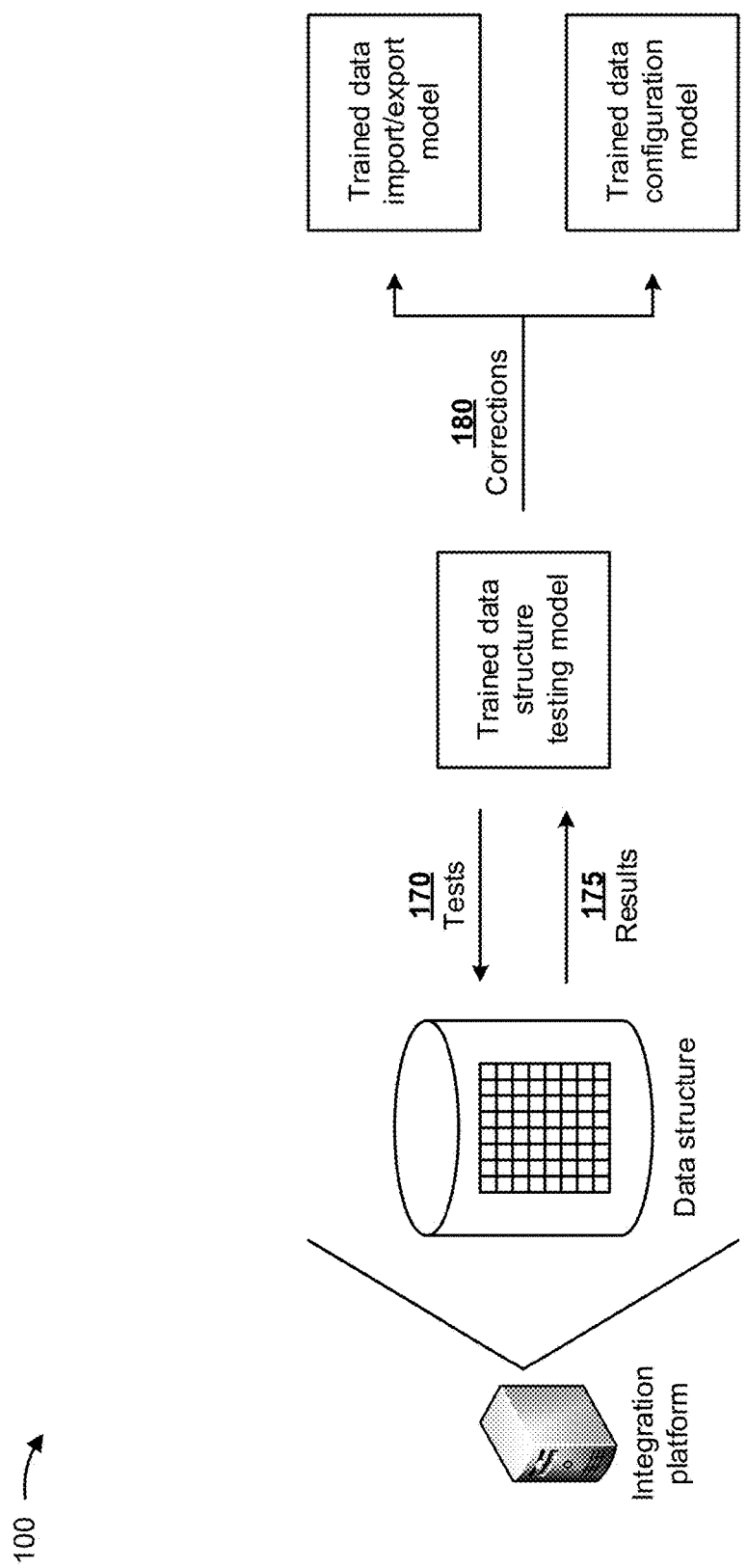

As shown in FIG. 1F, the integration platform may utilize a trained data structure testing model to test the generated data structure. In some implementations, the data structure testing model may include a machine learning model, a naïve Bayes biased classifier model, a deep learning neural network model, a neural network model, a support vector machine model, and/or the like. In some implementations, the data structure testing model may include a decision tree machine learning model. A decision tree machine learning model may utilize a decision tree (e.g., as a predictive model) to take observations about an item (e.g., represented by branches of the decision tree) to conclusions about a target variable of the item (e.g., represented by leaves of the decision tree). In some implementations, the decision tree machine learning model may include a classification tree model where the target variable takes a discrete set of values, the leaves represent class labels, and the branches represent conjunctions of features that lead to the class labels. In some implementations, the integration platform may utilize the historical data parameters and/or configuration information associated with other data structures to train the data structure testing model, and to generate the trained data structure testing model.

As further shown in FIG. 1F, and by reference number 170, the integration platform may utilize the trained data structure testing mode to generate tests for the data structure. In some implementations, the tests may include tests to determine whether the data types of the data are correct, tests to determine whether the data formats of the data are correct, tests to determine whether the configuration of the data structure is correct, and/or the like.

As further shown in FIG. 1F, and by reference number 175, the integration platform may receive results based on the tests for the data structure. In some implementations, the results may include information indicating that one or more of data types of the data are correct, information indicating that one or more of data types of the data are incorrect, information indicating that one or more of the data formats of the data are correct, information indicating that one or more of the data formats of the data are incorrect, information indicating that one or more portions of the configuration of the data structure are correct, information indicating that one or more portions of the configuration of the data structure are incorrect, and/or the like.

In some implementations, the integration platform may analyze the results of the tests to determine whether any corrections are required to the data structure, the data parameters, the trained data import/export model, and/or the trained data configuration model. If the integration platform determines that corrections are not required to the data structure, the data parameters, the trained data import/export model, and/or the trained data configuration model, the integration platform may continue to generate a user interface for the data structure, as described elsewhere herein. If the integration platform determines that corrections are not required to the data structure, the data parameters, the trained data import/export model, and/or the trained data configuration model, the integration platform may utilize the trained data structure testing model to determine the corrections for the data structure, the data parameters, the trained data import/export model, and/or the trained data configuration model.

For example, and as further shown in FIG. 1F by reference number 180, the integration platform may utilize the trained data structure testing model to determine corrections for the trained data import/export model and the trained data configuration model, and may provide the corrections to the trained data import/export model and the trained data configuration model. In some implementations, the corrections may include corrections to address any issues determined for the data structure, the data parameters, the trained data import/export model, and/or the trained data configuration model. For example, if a particular data format of the data in the data structure is incorrect or if a portion of the configuration of the data structure is incorrect, the integration platform may utilize this information to update the trained data import/export model and/or the trained data configuration model (e.g., to generate a re-trained data import/export model and/or a re-trained data configuration model.

Once updated, the re-trained data import/export model and/or the re-trained data configuration model may be utilized to generate an updated data structure. For example, if only the data import/export model is re-trained, the integration platform may utilize the re-trained data import/export model and the data to generate updated data parameters for the data, may utilize the trained data configuration model, the data, and the updated data parameters to generate an updated data structure configuration. The integration platform may generate an updated data structure for the data based on the updated data parameters and the updated data structure configuration, and may store the data in the updated data structure. In another example, if only the data configuration model is re-trained, the integration platform may utilize the re-trained data configuration model, the data, and the data parameters to generate an updated data structure configuration. The integration platform may generate an updated data structure for the data based on the data parameters and the updated data structure configuration, and may store the data in the updated data structure. In some implementations, this methodology may continue until the integration platform determines that corrections are not required to the data structure, the data parameters, the trained data import/export model, and/or the trained data configuration model.

Figure 1G:
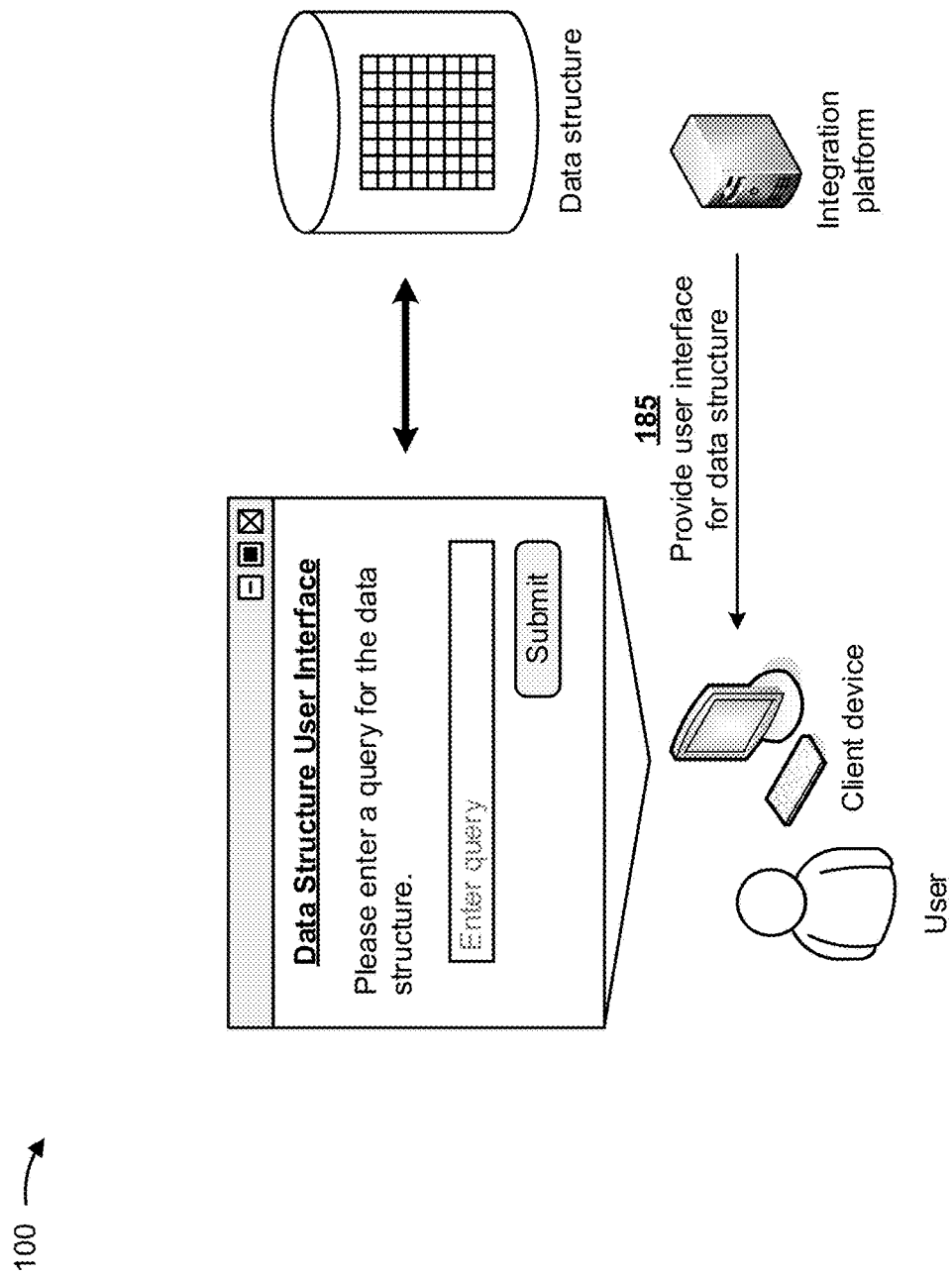

In some implementations, the integration platform may generate a user interface for accessing the data structure. The user interface may include information enabling the user of the client device to view, access, query, and/or the like the data provided in the data structure. As shown in FIG. 1G, and by reference number 185, the integration platform may provide the user interface to the client device, and the client device may provide the user interface for display to the user. As further shown in FIG. 1G, the user interface may include information that enables the user to provide a query for the data structure, and to receive information from the data structure based on the query.

In this way, several different stages of the process for integrating data and designing a data structure for the data are automated using artificial intelligence, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were previously performed using subjective human intuition or input, or were unable to be performed by humans in a big data context. These roles may include extracting and processing data from multiple diverse data sources, determining data parameters and/or a data structure configuration for the data, generating and testing the data structure for the data, and/or providing a unified view of the data via the data structure.

As indicated above, FIGS. 1A-1G are provided merely as examples. Other examples are possible and may differ from what was described with regard to FIGS. 1A-1G.

Figure 2:
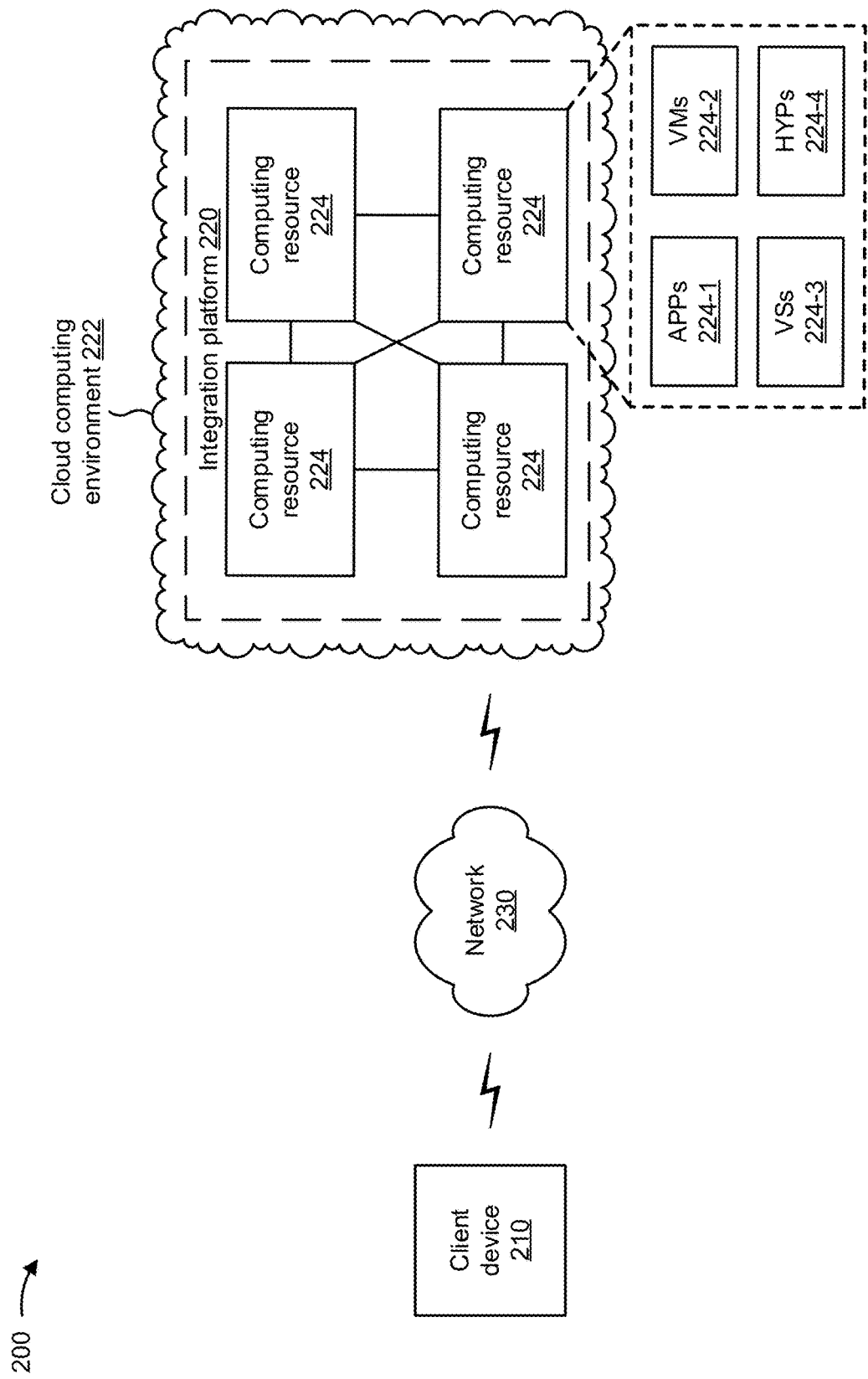
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an integration platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to integration platform 220.

Integration platform 220 includes one or more devices that identify utilizes artificial intelligence to integrate data from multiple diverse sources into a data structure. In some implementations, integration platform 220 may be designed to be modular such that certain software components may be swapped in or out depending on a particular need. As such, integration platform 220 may be easily and/or quickly reconfigured for different uses. In some implementations, integration platform 220 may receive information from and/or transmit information to one or more client devices 210.

In some implementations, as shown, integration platform 220 may be hosted in a cloud computing environment 222. Notably, while implementations described herein describe integration platform 220 as being hosted in cloud computing environment 222, in some implementations, integration platform 220 may not be cloud-based (i.e., may be implemented outside of a cloud computing environment) or may be partially cloud-based.

Cloud computing environment 222 includes an environment that hosts integration platform 220. Cloud computing environment 222 may provide computation, software, data access, storage, etc. services that do not require end-user knowledge of a physical location and configuration of system(s) and/or device(s) that hosts integration platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host integration platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with integration platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of integration platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
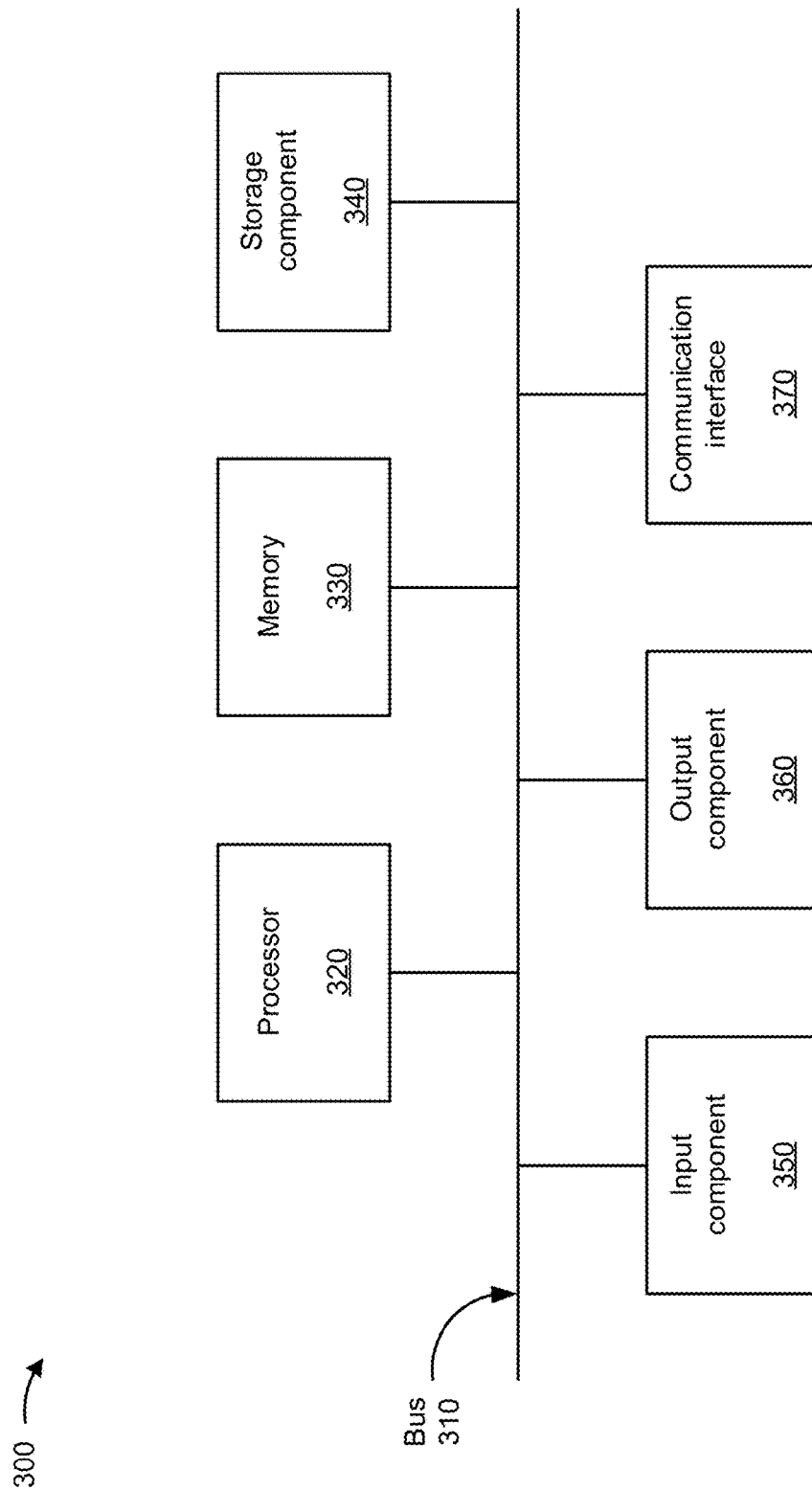
FIG. 3 is a diagram of example components of one or more devices of FIG. 2.

FIG. 3 is a diagram of example components of a device 300. Device 300 may correspond to client device 210, integration platform 220, and/or computing resource 224. In some implementations, client device 210, integration platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
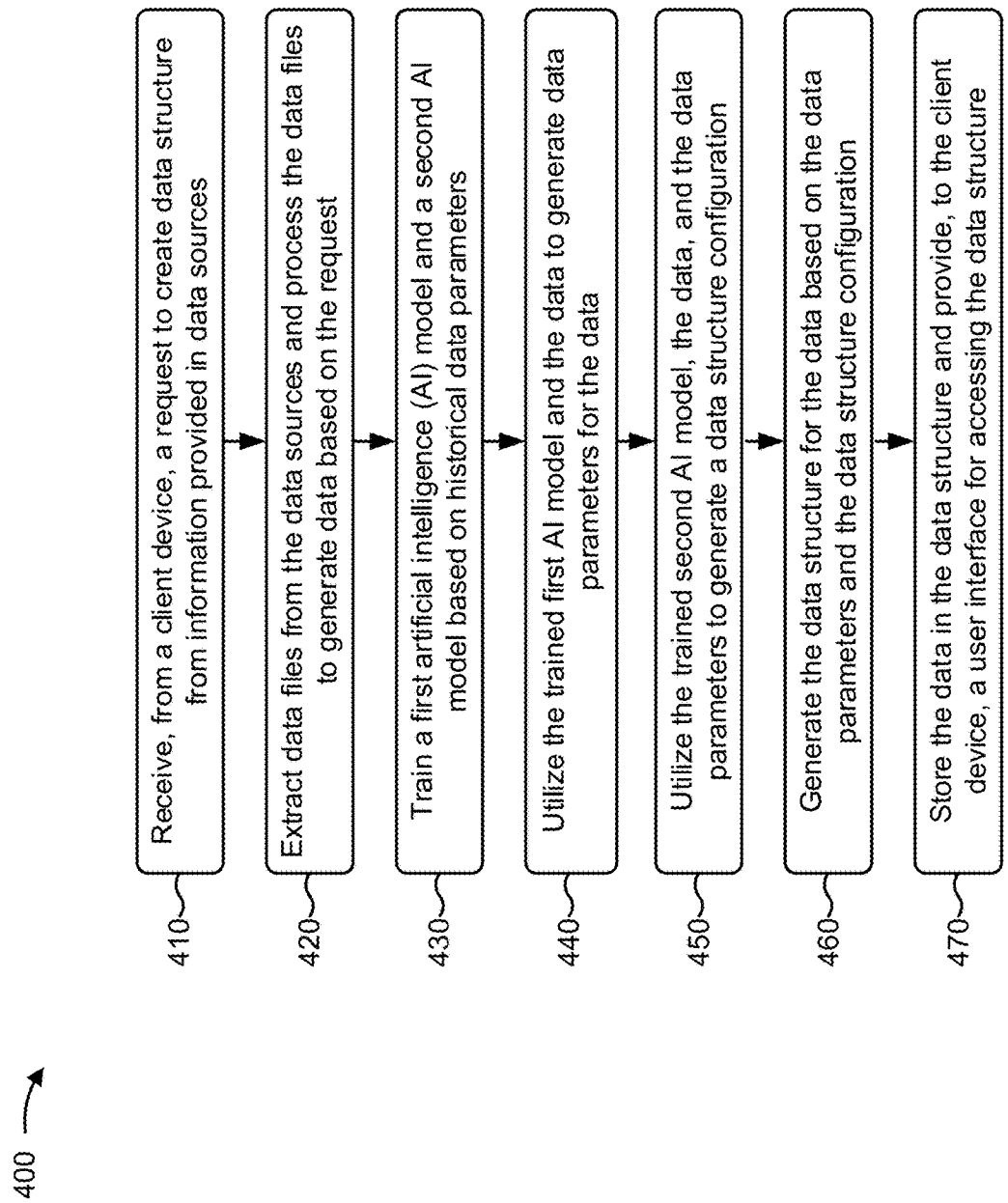
FIG. 4 is a flow chart of an example process for utilizing artificial intelligence to integrate data from multiple diverse sources into a data structure.

FIG. 4 is a flow chart of an example process 400 for utilizing artificial intelligence to integrate data from multiple diverse sources into a data structure. In some implementations, one or more process blocks of FIG. 4 may be performed by integration platform 220. In some implementations, one or more process blocks of FIG. 4 may be performed by another device or a group of devices separate from or including integration platform 220, such as client device 210.

As shown in FIG. 4, process 400 may include receiving, from a client device, a request to create a data structure from information provided in data sources (block 410). For example, integration platform 220 may receive, from client device 210, a request to create a data structure from information provided in data sources. In some implementations, a user associated with client device 210 may wish to integrate data from multiple different data sources into a unified view (e.g., one or more data structures with a user interface for accessing the one or more data structures). The user may utilize client device 210 to provide, to integration platform 220, a request to create a data structure, with an interface, from the multiple different data sources, and integration platform 220 may receive the request to create the data structure. In some implementations, the multiple different data sources may include multiple company databases with different data points, data types, data formats, etc. in one or more databases, multiple different groups of test results, and/or the like. In some implementations, each data source may include thousands, millions, billions, etc. of data points (e.g., big data). In some implementations, the data structure may include one more databases, tables, linked-lists, trees, and/or the like.

In this way, integration platform 220 may receive, from client device 210, the request to create the data structure from the information provided in the data sources.

As further shown in FIG. 4, process 400 may include extracting data files from the data sources and processing the data files to generate data based on the request (block 420). For example, integration platform 220 may extract data files from the data sources and may process the data files to generate data based on the request. In some implementations, based on the request to create the data structure, integration platform 220 may communicate with the multiple different data sources, and may extract data files from the multiple different data sources. In some implementations, one or more of the data files may include different data points, data types, data formats, and/or the like. In some implementations, integration platform 220 may utilize a variety of data file extraction methods to extract the data files, such as extracting the data files into flat files using SQL, extracting the data files into flat files using a program, exporting the data files into export files, and/or the like.

In some implementations, integration platform 220 may perform one or more processing techniques on one or more of the data files in order to convert the one or more data files into an electronic, or machine-encoded, data (e.g., processed data files). In some implementations, integration platform 220 may utilize OCR with the one or more data files in order to convert the one or more data files into electronic data files. In some implementations, integration platform 220 may utilize speech recognition with the one or more data files in order to convert one or more audio-based data files into text-based data files. In some implementations, integration platform 220 may utilize a natural language processing technique, a computational linguistics technique, a text analysis technique, and/or the like, with the processed data files and/or the one or more data files in order to make the data files analyzable.

In some implementations, integration platform 220 may utilize a variety of data extraction methods to extract the data from the processed data files, such as logical extraction methods (e.g., a full extraction method, an incremental extraction method, and/or the like, physical extraction methods (e.g., an online extraction method, an offline extraction method, and/or the like), and/or the like.

In some implementations, integration platform 220 may process the extracted data. In some implementations, integration platform 220 may utilize a data normalization method to process the extracted data and to eliminate and/or reduce redundant data from the extracted data. In some implementations, integration platform 220 may utilize a data cleansing method to process the extracted data and to detect and/or correct corrupt or inaccurate data from the extracted data. In some implementations, integration platform 220 may utilize a natural language processing technique, a computational linguistics technique, a text analysis technique, and/or the like, with the extracted data in order to make the extracted data analyzable. In some implementations, integration platform 220 may utilize an entity extraction method to identify and classify named entities in the extracted data into pre-defined categories. In some implementations, integration platform 220 may utilize a smart matching method, such as a string matching method, to identify where one or more strings (e.g., patterns) are located within the extracted data.

In this way, integration platform 220 may extract the data files from the data sources and may process the data files to generate the data based on the request.

As further shown in FIG. 4, process 400 may include training a first artificial intelligence model and a second artificial intelligence model based on historical data parameters (block 430). For example, integration platform 220 may train a first artificial intelligence model and a second artificial intelligence model based on historical data parameters. In some implementations, integration platform 220 may provide historical data parameters to a first artificial intelligence model (e.g., a data configuration model) and a second artificial intelligence model (e.g., a data import/export model). In some implementations, the historical data parameters may include data types (e.g., numbers, alphanumeric characters, characters, words, sentences, images, audio, video, and/or the like), data formats (e.g., text, a file format, an audio format, a video format, and/or the like), configuration information associated with data structures (e.g., relational database configuration information, non-relational database configuration information, cloud database configuration information, operational database configuration information, a centralized database configuration, and/or the like), data patterns, and/or the like associated with historical data previously processed by integrated platform 220 or by another device.

In some implementations, the data configuration model may include a machine learning model, a naïve Bayes biased classifier model, a deep learning neural network model, a neural network model, a support vector machine model, and/or the like. In some implementations, the data configuration model may include Knuth-Morris-Pratt machine learning model that provides a recommended data structure configuration for data based on the data and data parameters of the data. In some implementations, the data import/export model may include a machine learning model, a naïve Bayes biased classifier model, a deep learning neural network model, a neural network model, a support vector machine model, and/or the like. In some implementations, the data import/export model may include a k-means clustering machine learning model that determines data parameters based on the data.

In some implementations, integration platform 220 may utilize the historical data parameters to train the data configuration model, and to generate a trained data configuration model. In some implementations, integration platform 220 may utilize the historical data parameters to train the data import/export model, and to generate a trained data import/export model.

In this way, integration platform 220 may train the first artificial intelligence model and the second artificial intelligence model based on the historical data parameters.

As further shown in FIG. 4, process 400 may include utilizing the trained first artificial intelligence model and the data to generate data parameters for the data (block 440). For example, integration platform 220 may utilize the trained first artificial intelligence model and the data to generate data parameters for the data. In some implementations, integration platform 220 may provide the data (e.g., the extracted and processed data) to the trained first artificial intelligence model (e.g., the trained data import/export model) and the trained second artificial intelligence model (e.g., the trained data configuration model). In some implementations, the trained data import/export model may generate data parameters (e.g., data types, data formats, configuration information associated with data structures, data patterns, data ranges, and/or the like) for the data. In some implementations, the trained data import/export model may cluster the extracted data with particular historical data associated with particular historical data parameters, and may identify the particular historical data parameters as the data parameters for the data.

In this way, integration platform 220 may utilize the trained first artificial intelligence model and the data to generate the data parameters for the data.

As further shown in FIG. 4, process 400 may include utilizing the trained second artificial intelligence model, the data, and the data parameters to generate a data structure configuration (block 450). For example, integration platform 220 may utilize the trained second artificial intelligence model, the data, and the data parameters to generate a data structure configuration. In some implementations, the trained first artificial intelligence model (e.g., the trained data import/export model) may provide the data parameters to the trained first artificial intelligence model (e.g., the trained data configuration model). In some implementations, the trained data configuration model may generate a data structure configuration for the data based on the data and the data parameters. In some implementations, the trained data configuration model may match a proposed data structure configuration (e.g., determined based on the data and the data parameters) with a previous data structure configuration (e.g., determined based on the historical data parameters) in order to generate the data structure configuration for the data. In some implementations, the trained data configuration model may match the data parameters with particular historical data parameters, may determine a historical data structure configuration associated with the particular historical data patterns, and may identify the historical data structure configuration as the data structure configuration for the data. In some implementations, the data structure configuration may include configuration information indicating a type of data structure configuration (e.g., a database, a tree, a linked-list, and/or the like), an arrangement of data in the data structure (e.g., a relational arrangement, a non-relational arrangement, a number of columns, a number of rows, and/or the like), and/or the like.

In this way, integration platform 220 may utilize the trained second artificial intelligence model, the data, and the data parameters to generate the data structure configuration.

As further shown in FIG. 4, process 400 may include generating the data structure for the data based on the data parameters and the data structure configuration (block 460). For example, integration platform 220 may generate the data structure for the data based on the data parameters and the data structure configuration. In some implementations, integration platform 220 may generate a data structure (e.g., for the extracted data) based on the data parameters and the configuration information. In some implementations, the data structure may include a configuration that matches the data structure configuration generated by the trained data configuration model. For example, the data structure may include a type of data structure configuration (e.g., a database, a tree, a linked-list, and/or the like), an arrangement of data in the data structure (e.g., a relational arrangement, a non-relational arrangement, a number of columns, a number of rows, and/or the like), and/or the like that matches the type of data structure configuration, the arrangement of data, and/or the like of the data structure configuration generated by the trained data configuration model.

In this way, integration platform 220 may generate the data structure for the data based on the data parameters and the data structure configuration.

As further shown in FIG. 4, process 400 may include storing the data in the data structure and providing, to the client device, a user interface for accessing the data structure (block 470). For example, integration platform 220 may store the data in the data structure and may provide, to client device 210, a user interface for accessing the data structure. In some implementations, integration platform 220 may add the extracted data to the generated data structure. In some implementations, integration platform 220 may add the extracted data to the data structure in a manner such that the generated data parameters are satisfied. For example, if the data parameters indicate that data types of the data are numbers and characters, and that a data format of the data is in a spreadsheet with columns and rows, integration platform 220 may add the data as numbers and characters in columns and rows of the data structure.

In some implementations, integration platform 220 may generate a user interface for accessing the data structure. The user interface may include information enabling the user of client device 210 to view, access, query, and/or the like the data provided in the data structure. In some implementations, integration platform 220 may provide the user interface to client device 210, and client device 210 may provide the user interface for display to the user. In some implementations, the user interface may include information that enables the user to provide a query for the data structure, and to receive information from the data structure based on the query.

In this way, integration platform 220 may store the data in the data structure and may provide, to client device 210, the user interface for accessing the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide an integration platform that utilizes artificial intelligence to automatically integrate data from multiple diverse sources into a unified view of the data (e.g., a data structure). For example, the integration platform may extract data files from multiple diverse data sources, and may process the data files to generate data. The integration platform may train a first artificial intelligence model and a second artificial intelligence model based on historical data parameters, and may utilize the trained first artificial intelligence model and the data to generate data parameters. The integration platform may utilize the trained second artificial intelligence model, the data, and the data parameters to generate a data structure configuration, and may generate the data structure based on the data parameters and the data structure configuration. The integration platform may store the data in the data structure, and may provide a user interface for accessing the data structure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
extract data files from a plurality of different data sources;
process the data files to generate data from the data files;
train a first artificial intelligence model and a second artificial intelligence model based on historical data parameters, the historical data parameters being associated with historical data previously processed by the device;
utilize the trained first artificial intelligence model and the data to generate data parameters for the data;
utilize the trained second artificial intelligence model, the data, and the data parameters to generate a data structure configuration;
generate a data structure for the data based on the data parameters and the data structure configuration;
store the data in the data structure;
provide a user interface for accessing the data structure;
utilize a trained third artificial intelligence model to test the data structure, prior to providing the user interface, and to identify one or more corrections to the data structure,
wherein the trained third artificial trained model includes a decision tree machine learning model,
wherein the decision tree machine learning model utilizes a decision tree associated with a target variable of an item;
implement the one or more corrections in the data structure to generate an updated data structure; and
provide another user interface for accessing the updated data structure.

2. The device of claim 1, wherein the one or more processors are further to:
receive, from a client device, a request to create the data structure from the data files provided in the plurality of different data sources; and
provide the user interface to the client device based on the request.

3. The device of claim 1, wherein, when processing the data files to generate data from the data files, the one or more processors are to:
extract the data from the data files.

4. The device of claim 1, wherein the one or more processors are further to:
utilize the trained third artificial intelligence model to identify one or more corrections to the trained first artificial intelligence model;
implement the one or more corrections in the trained first artificial intelligence model to generate a re-trained first artificial intelligence model;
utilize the re-trained first artificial intelligence model and the data to generate updated data parameters for the data;
utilize the trained second artificial intelligence model, the data, and the updated data parameters to generate an updated data structure configuration;
generate an updated data structure for the data based on the updated data parameters and the updated data structure configuration;
store the data in the updated data structure; and
provide another user interface for accessing the updated data structure.

5. The device of claim 1, wherein the one or more processors are further to:
utilize the trained third artificial intelligence model to identify one or more corrections to the trained second artificial intelligence model;
implement the one or more corrections in the trained second artificial intelligence model to generate a re-trained second artificial intelligence model;
utilize the re-trained second artificial intelligence model, the data, and the data parameters to generate an updated data structure configuration;
generate an updated data structure for the data based on the data parameters and the updated data structure configuration;
store the data in the updated data structure; and
provide another user interface for accessing the updated data structure.

6. The device of claim 1, wherein the user interface provides a unified view of the data stored in the data structure.

7. The device of claim 1, wherein the trained second artificial intelligence model includes:
a Knuth-Morris-Pratt machine learning model.

8. A non-transitory computer-readable medium storing instructions, the instructions comprising:
one or more instructions that, when executed by one or more processors, cause the one or more processors to:
receive, from a client device, a request to create a data structure from a plurality of different data sources;
extract data files from the plurality of different data sources based on the request;
process the data files to generate processed data files;
extract data from the processed data files;
process the data to generate processed data;
train a first artificial intelligence model and a second artificial intelligence model based on historical data parameters,
the historical data parameters being associated with previously processed historical data;
utilize the trained first artificial intelligence model and the processed data to generate data parameters for the processed data;
utilize the trained second artificial intelligence model, the processed data, and the data parameters to generate a data structure configuration;
generate a data structure for the processed data based on the data parameters and the data structure configuration;
store the processed data in the data structure;
provide a user interface for accessing the data structure;
utilize a trained third artificial intelligence model to test the data structure, prior to providing the user interface, and to identify one or more corrections to the data structure,
wherein the trained third artificial trained model includes a decision tree machine learning model,
wherein the decision tree machine learning model utilizes a decision tree associated with a target variable of an item;
implement the one or more corrections in the data structure to generate an updated data structure; and
provide another user interface for accessing the updated data structure.

9. The non-transitory computer-readable medium of claim 8, wherein the instructions further comprise:
one or more instructions that, when executed by the one or more processors, cause the one or more processors to:
temporarily store the processed data.

10. The non-transitory computer-readable medium of claim 8, wherein the one or more instructions, that cause the one or more processors to extract the data from the processed data files, cause the one or more processors to:
extract the data from the processed data files based on one of:
a full extraction method,
an incremental extraction method,
an online extraction method, or
an offline extraction method.

11. The non-transitory computer-readable medium of claim 8, wherein the instructions further comprise:
one or more instructions that, when executed by the one or more processors, cause the one or more processors to:
utilize the trained third artificial intelligence model to identify one or more corrections to the trained first artificial intelligence model;
implement the one or more corrections in the trained first artificial intelligence model to generate a re-trained first artificial intelligence model;
utilize the re-trained first artificial intelligence model and the processed data to generate updated data parameters for the processed data;
utilize the trained second artificial intelligence model, the processed data, and the updated data parameters to generate an updated data structure configuration;
generate an updated data structure for the processed data based on the updated data parameters and the updated data structure configuration;
store the processed data in the updated data structure; and
provide another user interface for accessing the updated data structure.

12. The non-transitory computer-readable medium of claim 8, wherein the instructions further comprise:
one or more instructions that, when executed by the one or more processors, cause the one or more processors to:
utilize the trained third artificial intelligence model to identify one or more corrections to the trained second artificial intelligence model;
implement the one or more corrections in the trained second artificial intelligence model to generate a re-trained second artificial intelligence model;
utilize the re-trained second artificial intelligence model, the processed data, and the data parameters to generate an updated data structure configuration;
generate an updated data structure for the processed data based on the data parameters and the updated data structure configuration;
store the processed data in the updated data structure; and
provide another user interface for accessing the updated data structure.

13. The non-transitory computer-readable medium of claim 8, wherein the one or more instructions, that cause the one or more processors to process the data to generate the processed data, cause the one or more processors to:
process the data to generate the processed data based on one of:
a data normalization method,
a data cleansing method,
a natural language processing technique,
an entity extraction method, or
a smart matching method.

14. The non-transitory computer-readable medium of claim 8, wherein the trained first model includes:
a k-means clustering machine learning model.

15. A method, comprising:
extracting, by a device, data files from a plurality of different data sources;
extracting, by the device, data from the data files;
training, by the device, a first artificial intelligence model and a second artificial intelligence model based on historical data parameters,
the historical data parameters being associated with historical data previously processed by the device;
utilizing, by the device, the trained first artificial intelligence model and the data to generate data parameters for the data;
utilizing, by the device, the trained second artificial intelligence model, the data, and the data parameters to generate a data structure configuration;
generating, by the device, a data structure for the data based on the data parameters and the data structure configuration;
storing, by the device, the data in the data structure;
providing, by the device, a user interface for accessing the data structure;
utilizing, by the device, a trained third artificial intelligence model to test the data structure, prior to providing the user interface, and to identify one or more corrections to the data structure,
wherein the trained third artificial trained model includes a decision tree machine learning model,
wherein the decision tree machine learning model utilizes a decision tree associated with a target variable of an item;
implementing, by the device, the one or more corrections in the data structure to generate an updated data structure; and
providing, by the device, another user interface for accessing the updated data structure.

16. The method of claim 15, further comprising:
receiving, from a client device, a request to create the data structure from the plurality of different data sources; and
providing the user interface to the client device based on the request.

17. The method of claim 15, further comprising:
processing the data based on one of:
a data normalization method,
a data cleansing method,
a natural language processing technique,
an entity extraction method, or
a smart matching method.

18. The method of claim 15, further comprising:
temporarily storing the data when the data is extracted from the data files.

19. The method of claim 15, wherein extracting the data from the data files includes:
extracting the data from the data files based on one of:
a full extraction method,
an incremental extraction method,
an online extraction method, or
an offline extraction method.

20. The method of claim 15, wherein the user interface provides a unified view of the data stored in the data structure.

* * * * *